(12) United States Patent
McKenzie et al.

(10) Patent No.: US 7,936,532 B2
(45) Date of Patent: May 3, 2011

(54) SELECTIVELY INHIBITING TRANSDUCER OUTPUT RESPONSIVE TO DETECTED JERK

(75) Inventors: Lealon Ray McKenzie, Shakopee, MN (US); Steve M. Gaub, Longmont, CO (US); Sandeep D. Sequeira, Johnstown, CO (US); Matthew McLeod Chadsey, Mead, CO (US)

(73) Assignee: Seagate Technology LLC, Scotts Valley, CA (US)

( * ) Notice: Subject to any disclaimer, the term of this patent is extended or adjusted under 35 U.S.C. 154(b) by 405 days.

(21) Appl. No.: 11/931,623

(22) Filed: Oct. 31, 2007

(65) Prior Publication Data

US 2008/0278841 A1    Nov. 13, 2008

Related U.S. Application Data

(60) Provisional application No. 60/928,830, filed on May 11, 2007.

(51) Int. Cl.
*G11B 15/46* (2006.01)
(52) U.S. Cl. .................................. 360/73.03
(58) Field of Classification Search ........... 360/73.03, 360/75, 61, 39
See application file for complete search history.

(56) References Cited

U.S. PATENT DOCUMENTS

| | | | |
|---|---|---|---|
| 6,115,200 A | 9/2000 | Allen et al. | |
| 6,229,664 B1 * | 5/2001 | Albrecht et al. | 360/75 |
| 6,417,979 B1 | 7/2002 | Patton, III et al. | |
| 6,429,990 B2 | 8/2002 | Serrano et al. | |
| 6,801,381 B2 * | 10/2004 | Iwai et al. | 360/73.03 |
| 6,933,930 B2 * | 8/2005 | Devige et al. | 345/173 |
| 6,975,476 B1 | 12/2005 | Berding | |
| 7,023,640 B1 | 4/2006 | Codilian et al. | |
| 7,209,311 B2 | 4/2007 | Ueda et al. | |

* cited by examiner

*Primary Examiner* — Fred Tzeng
(74) *Attorney, Agent, or Firm* — David K. Lucente

(57) ABSTRACT

Various embodiments relate to selectively inhibiting output from a transducer in response to the rate of change of acceleration that is experienced by the transducer. The rate of change of an acceleration signal, which is indicative of transducer's acceleration, is detected. Output of a signal through the transducer is selectively inhibited in response to the detected rate of change of the acceleration signal. A related apparatus can include a circuit that detects the rate of change of an acceleration signal and generates a transducer output inhibit signal in response to the detected rate of change of the acceleration signal. The transducer writes data on a recordable media. The accelerometer generates an acceleration signal that is indicative of transducer vibration. The circuit selectively inhibits writing of data through the transducer in response to a rate of change of the acceleration signal.

20 Claims, 3 Drawing Sheets

SELECTIVELY INHIBITING TRANSDUCER OUTPUT RESPONSIVE TO DETECTED JERK

RELATED APPLICATION

This application claims the benefit of and priority to U.S. Provisional Patent Application No. 60/928,830 entitled "Jerk Detection to Minimize Adjacent Track Overwrite in Disk Drives," filed May 11, 2007, the disclosure of which is hereby incorporated herein by reference as if set forth in its entirety.

BACKGROUND

The present invention generally relates to transducers that may be used to write data on media and, more particularly, to operation of transducers in a vibration environment.

Disk drives are digital data storage devices which can enable users of computer systems to store and retrieve large amounts of data in a fast and efficient manner. A typical disk drive includes a plurality of magnetic recording disks which are mounted to a rotatable hub of a spindle motor and rotated at a high speed. Transducers used in disk drives are typically referred to as heads. An array of read/write heads is disposed adjacent surfaces of the disks to transfer data between the disks and a host computer. The heads can be radially positioned over the disks by a rotary actuator and a closed loop servo system, and can fly proximate the surfaces of the disks upon air bearings.

Vibration of the disk drive can cause heads to have an across-track vibration, which can affect the ability of a servo system to maintain the heads on track during track following operations. Some disk drives have acceleration (shock) detection circuits that detect the acceleration experienced by the heads, and inhibit writing data through the heads when the acceleration becomes excessive. By inhibiting writing in excessive acceleration conditions, the disk drive may avoid writing on adjacent tracks which may otherwise lead to an unintended loss of data therein.

SUMMARY

Various embodiments of the present invention relate to selectively inhibiting output from a transducer in response to a rate of change of acceleration (i.e., jerk) that is experienced by the transducer.

In some embodiments, the rate of change of an acceleration signal, which is indicative of a transducer's acceleration, is detected. Output of a signal through the transducer is selectively inhibited in response to the detected rate of change of the acceleration signal.

In some other embodiments, an apparatus includes a circuit that detects the rate of change of an acceleration signal and generates a transducer output inhibit signal in response to the detected rate of change of the acceleration signal.

In yet some other embodiments, an apparatus includes a transducer, an accelerometer, and a circuit. The transducer writes data on a recordable media. The accelerometer generates an acceleration signal that is indicative of transducer vibration. The circuit selectively inhibits writing of data through the transducer in response to a rate of change of the acceleration signal.

DETAILED DESCRIPTION

Figure 1:
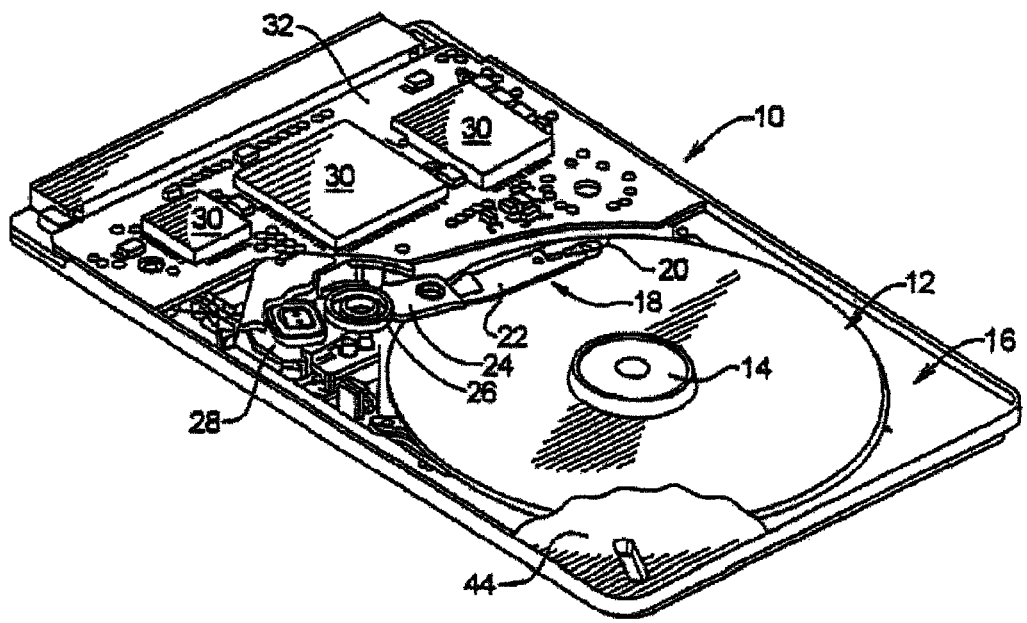
FIG. 1 is a perspective view of a disk drive with electronic circuits that are configured in accordance with at least some embodiments of the present invention.

Various embodiments of the present invention will now be described more fully hereinafter with reference to the accompanying drawings. However, this invention should not be construed as limited to the embodiments set forth herein. Rather, these embodiments are provided so that this disclosure will be thorough and complete, and will convey the scope of the invention to those skilled in the art.

It will be understood that, as used herein, the term "comprising" or "comprises" is open-ended, and includes one or more stated elements, steps and/or functions without precluding one or more unstated elements, steps and/or functions. As used herein, the singular forms "a", "an" and "the" are intended to include the plural forms as well, unless the context clearly indicates otherwise. The term "and/or" and "/" includes any and all combinations of one or more of the associated listed items. In the drawings, the size and relative sizes of regions may be exaggerated for clarity. Like numbers refer to like elements throughout.

Some embodiments may be embodied in hardware and/or in software (including firmware, resident software, microcode, etc.). Consequently, as used herein, the term "signal" may take the form of a continuous waveform and/or discrete value(s), such as digital value(s) in a memory or register. Furthermore, various embodiments may take the form of a computer program product on a computer-usable or computer-readable storage medium having computer-usable or computer-readable program code embodied in the medium for use by or in connection with an instruction execution system.

Embodiments are described below with reference to block diagrams and operational flow charts. It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Although various embodiments of the present invention are described in the context of disk drives for purposes of illustration and explanation only, the present invention is not limited thereto. It is to be understood that the present invention can be more broadly embodied within any circuits and operations that selectively inhibit output from any type of transducer in response to a rate of change of an acceleration signal which is indicative of transducer vibration. Accordingly, while the transducer may be a head that is configured to write data on a data storage disk within a disk drive, the term transducer is not limited thereto.

A simplified diagrammatic representation of a disk drive, generally designated as 10, is illustrated in FIG. 1. The disk drive 10 includes at least one disk 12 or disk stack (illustrated as a single disk in FIG. 1) that is rotated by a spindle motor 14. The spindle motor 14 is mounted to a base plate 16. An actuator 18 is also mounted to the base plate 16. The disk drive 10 is configured to store and retrieve data responsive to write and read commands from a host device. A host device can include, but is not limited to, a desktop computer, a laptop computer, a personal digital assistant (PDA), a digital video recorder/player, a digital music recorder/player, and/or another electronic device that can be communicatively coupled to store and retrieve data in the disk drive 10.

The actuator 18 includes a head 20 (or transducer) mounted to a flexure arm 22 which is attached to an actuator arm 24 that can rotate about a pivot bearing assembly 26. The head 20 may, for example, include a magnetoresistive (MR) element and/or a thin film inductive (TFI) element. The actuator 18 also includes a servo motor 28 (e.g., voice coil motor (VCM)) which moves the head 20 relative to the disk 12. The spindle motor 14 and servo motor 28 are coupled to controllers, read/write channel circuits, and other associated electronic circuits 30 which can be enclosed within one or more integrated circuit packages mounted to a printed circuit board (PCB) 32. The controllers, read/write channel circuits, and other associated electronic circuits 30 are referred to below as "controllers and other circuits" for brevity. The controllers and other circuits 30 may include analog circuitry and/or digital circuitry, such as a gate array and/or microprocessor-based instruction processing device(s) (e.g., general purpose microprocessor and/or digital signal processor).

Data is stored on the disk 12 within a number of concentric tracks (or cylinders). Each track is divided into a plurality of radially extending sectors. Each sector is further divided into a servo sector and a data sector. The servo sectors of the disks 34 are used to, among other things, accurately position the head 20 so that data can be properly written onto and read from a selected one of the disks 34. Exemplary servo data that may be stored in at least some of the servo sectors may include, for example, a DC erase field, a preamble field, a servo address mark (SAM) field, and a servo burst field of circumferentially staggered radially offset servo bursts (e.g., A, B, C, D servo bursts). The data sectors are where non-servo related data (i.e., host device data) is stored and retrieved.

Figure 2:
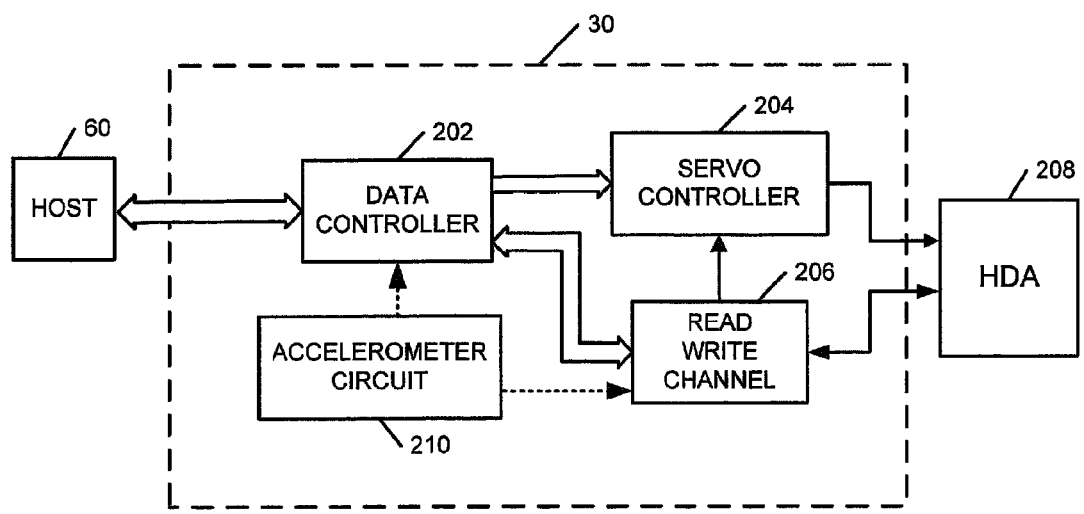
FIG. 2 is a block diagram of a portion of the controllers and other electronic circuits of the disk drive shown in FIG. 1, and which are configured in accordance with some embodiments of the present invention.

FIG. 2 is a block diagram of a portion of the controllers and other circuits 30 of the disk drive 10 shown in FIG. 1, according to some embodiments, and which can be communicatively connected to a host device 60. The controllers and other circuits 30 can include a data controller 202, a servo controller 204, and a read write channel 206. Although two separate controllers 202 and 204 and a read write channel 206 have been shown for purposes of illustration and discussion, it is to be understood that their functionality described herein may be integrated within a common integrated circuit package or distributed among more than one integrated circuit package. The head disk assembly (HDA) 208 can include a plurality of the disks 12, the actuator 18 with a plurality of heads 20 positioned adjacent to different data storage surfaces of the disks 12, the servo motor 28, and the spindle motor 14.

The data controller 202 carries out write commands by formatting the associated data into blocks with the appropriate header information, and transferring the formatted data via the read/write channel 206 to logical block addresses (LBAs) on the disk 12 identified by the associated write command.

The read write channel 206 can convert data between the digital signals processed by the data controller 202 and the analog write signals conducted through the head 20 in the HDA 208. The read write channel 206 provides servo data read from the HDA 208 to the servo controller 204. The servo data can be used to detect the location of the head 20 in relation to LBAs on the disk 12. The servo controller 204 can use LBAs from the data controller 202 and the servo data to seek the head 20 to an addressed track and block on the disk 12, and to attempt to maintain the head 20 aligned with the track while data is written/read on the disk 12.

Vibration of the disk drive 10 can cause the head 20 to have an across track vibration, which can affect the ability of the servo controller 204 to maintain the head 20 on a selected track during a track following operation. For example, the head 20 can be vibrated off-track while writing data between servo wedges. Upon reaching the next servo wedge, the servo controller 204 can identify the off-track head movement, inhibit writing if the transducer is positioned beyond certain off-track limits, and move the head 20 back on-track, resulting in single wedge off-track (SWOT) writing. As explained above, when the head 20 writes off-track it can overwrite or corrupt data on an adjacent track.

As the storage density of the disk 12 (e.g., tracks per inch) increases, the disk drive 10 can be increasingly susceptible to high-frequency, low amplitude shocks, causing off-track writing. Such high frequency, low amplitude shocks can be caused by, for example, adjacent disk drives (e.g., multi-disk drive/RAID system) and/or other moving devices (e.g., fans), and/or by movement of the disk drive itself.

The disk drive includes an accelerometer circuit 210 that senses vibration (shock) and generates an acceleration signal which is indicative of head vibration. Some embodiments of the present invention may arise from a realization that the acceleration signal by itself may not adequately indicate the presence of some vibration characteristics under which it can be particularly difficult for the servo controller 204 to maintain the head 20 on-track while writing. For example, high-frequency low amplitude shocks can have a short duration but fast rising amplitude (high jerk) leading edge that can result in sufficient cross-track movement of the head 22 to cause an unacceptable level of off-track writing, such as on high data storage density disks.

In accordance with some embodiments, the accelerometer circuit 210 detects the rate of change of the acceleration signal (derivative of the acceleration), and, in response thereto, generates an inhibit signal (or jerk signal) that can trigger the read write channel 206 to inhibit writing on the disk 12. Alternatively or additionally, the accelerometer circuit 210 may provide the inhibit signal to the data controller 202 which may then regulate writing by the read write channel 206 through the head 20.

The rate of change of the acceleration signal (or jerk) can provide an early warning for the onset of a vibration condition that can cause the head 20 to move off-track. For example, the acceleration signal may include a one-half sine-wave component having rapidly changing leading edges (high jerk) that track high-frequency low amplitude vibration, and which can be identified from the rate of change of the acceleration signal. Accordingly, by generating the inhibit signal using the rate of change of the acceleration signal, the read write channel 206 can be regulated so as to more quickly respond to the onset of a vibration condition that can cause the head 20 to move off-track, and which may allow the read write channel 206 to inhibit writing when the acceleration signal alone may have caused only a more slow response or may not have caused any response to occurrence of that vibration condition.

Figure 3:
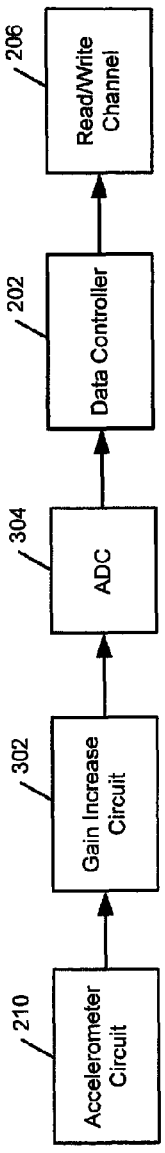
FIG. 3 is a block diagram of a circuit that selectively inhibits writing through a transducer in response to detected rate of change of an acceleration signal in accordance with some embodiments.

FIG. 3 is a block diagram of a circuit that selectively inhibits writing through a transducer responsive to a detected rate of change of an acceleration signal. The circuit may be embodied at least partially within the accelerometer circuit 210, the data controller 202, and/or other components of the disk drive 10 of FIGS. 1 and 2 to selectively inhibit writing through the head 20 in accordance with some embodiments. Accordingly, referring to FIG. 3, the circuit can include the accelerometer circuit 210, a gain increase circuit 302, an analog to digital converter (ADC) 304, the data controller 202, and the read/write channel 206.

The gain increase circuit 302 increases the frequency response gain of the acceleration signal from the accelerometer circuit 210, and may be configured to increase the frequency response gain by at least 10 times to, for example, facilitate rapid identification and response to the onset high-frequency low-amplitude vibration conditions. The ADC 304 generates discrete time samples of the higher frequency acceleration signal. The data controller 202 can detect the rate of change of the acceleration signal in response to variation over time between the discrete time samples (i.e., differentiate the acceleration signal in the discrete time domain). For example, the data controller 202 may determine the rate of change based on differences between sequentially occurring ones of the discrete time samples. The data controller 202 can generate an inhibit signal in response to the rate of change of the acceleration signal becoming outside an acceleration threshold range. The read/write channel 206 can selectively inhibit output of a write signal through the head 20 in response to the inhibit signal.

Because the gain increase circuit 302 increases the frequency response gain of the acceleration signal before sampling by the ADC 304, rapid changes occurring in the leading edges of the acceleration signal due to certain vibration conditions (e.g. high-frequency low-amplitude vibration) can be sufficiently amplified so that they can be more rapidly identified and trigger generation of the inhibit signal by the data controller 202. More particularly, rapid changes in the acceleration signal can be sufficiently amplified so that they are adequately reflected in the time sampled signal, and so that they can result in a sufficient spike in a time derivative of the sampled signal so that vibration condition can be detected when the time derivative is compared to a threshold range.

In some further embodiments, the data controller 202 may selectively inhibit writing by the read write channel 206 in response to both the rate of change of the acceleration signal and to the acceleration signal itself. For example, the read write channel 206 may be regulated so that writing through the head 20 is selectively inhibited in response to the rate of change (jerk signal) of the acceleration signal becoming outside a jerk threshold range, and can be selectively inhibited in response to an amplitude of the acceleration signal becoming outside an acceleration threshold range. Accordingly, writing through the head 20 can be selectively inhibited so as compensate both for the vibration induced jerk experienced by the head 20 and for acceleration characteristics experienced by the head 20. Writing may therefore be inhibited responsive to when the head 20 is subjected to high-frequency low-amplitude vibration that causes the rate of change of the acceleration signal to become outside the jerk threshold range, and can be separately inhibited responsive to when the head 20 is subjected to low-frequency high-amplitude vibration the causes the amplitude of the acceleration signal to become outside the acceleration threshold range. The disk drive 10 may thereby reduce the occurrence of off-track writing by identifying and responding to a wider range of vibration conditions that can cause off-track deviation of the head 20.

Although the operation of the exemplary block diagram of FIG. 3 has been described with regard to five different circuits 210, 302, 304, 202, and 206 for ease of illustration and explanation, it is not limited thereto. It is to be understood that the various exemplary circuits shown therein may instead be integrated within a common physical electronic device or may be distributed across any number of physical electronic devices. For example, the circuits 210, 302, 304, 202, and 206 can be implemented within a hybrid circuit and/or a multichip module.

Figure 4:
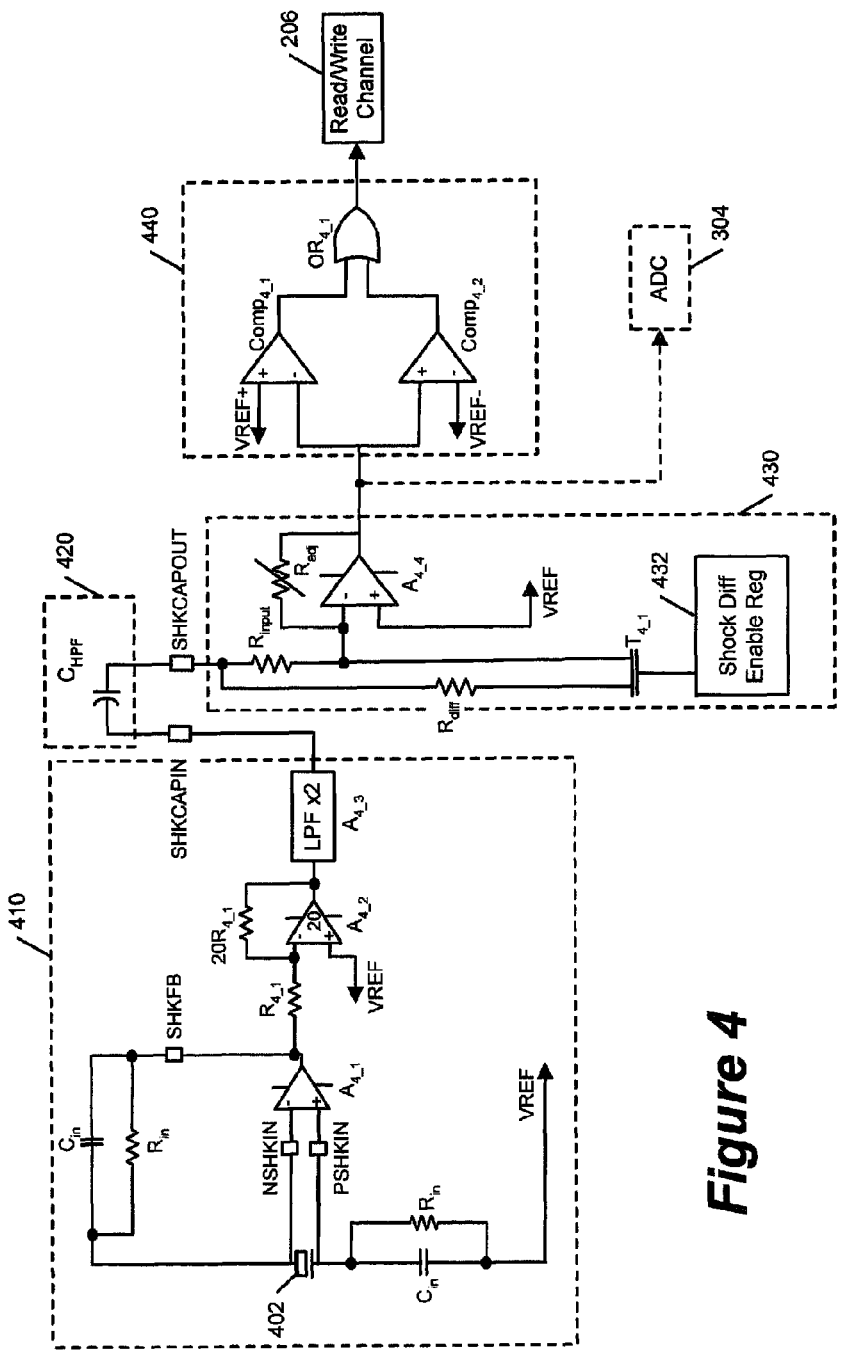
FIG. 4 is a circuit diagram of a circuit that selectively inhibits writing through a transducer in response to detected rate of change of an acceleration signal in accordance with some embodiments.

FIG. 4 is a circuit diagram of another circuit that selectively inhibits writing through a transducer in response to detected rate of change of an acceleration signal in accordance with some embodiments. Referring to FIG. 4, the circuit includes an accelerometer circuit 410 that generates and conditions an acceleration signal, a differentiator circuit 420 that differentiates (i.e., determines the rate of change in) the acceleration signal to generate a jerk signal, a gain increase circuit 430 that increases the frequency response gain of the jerk signal (the differentiated acceleration signal), and a threshold range comparator 440 that generates an inhibit signal when the increased gain jerk signal is outside a threshold range. As explained above, the read write channel 206 inhibits writing through the head 20 in response to the inhibit signal. The increased gain jerk signal may also be sampled by the ADC 304 for further processing by the data controller 202. For example the data controller 202 may compare the sampled signal to one or more threshold values to identify when writing should be inhibited through the head 20 because of onset/occurrence of at least a threshold jerk/vibration condition.

The accelerometer circuit 410 includes an accelerometer 402, which may include, for example, a piezoelectric element that is configured to generate charge (picoCoulombs) that is modulated by vibration. A charge amplifier circuit is formed by a pair of parallel connected input capacitors $C_{in}$ and input resistors $R_{in}$, with one pair connected between a terminal PSHKIN of the accelerometer 402 and a reference voltage Vref, and the other pair connected between another terminal NSHKIN of the accelerometer 402 and an output node SHKFB of an amplifier $A_{4\_1}$ connected across the terminals NSHKIN and PSHKIN of the accelerometer 402. The amplifier $A_{4\_1}$ senses vibration induced variation in the capacitance of the transducer 402 to output a capacitance signal at the output node SHKFB. The charge amplifier circuit may, for example, be configured to generate a sine/half-sine wave signal of at least 50 Hz.

The capacitance signal is amplified by an amplifier $A_{4\_2}$, shown as an operational amplifier having a gain of 20 with an input resistor $R_{4\_1}$ and a feedback resistor $20R_{4\_1}$ (20 times the resistance of $R_{4\_1}$). The amplified capacitance signal is passed through a low pass filter (LPF) to reduce noise. The exemplary LPF has a gain of two.

The differentiator circuit 420 may include a high pass filter, such as the exemplary high-pass filter capacitor $C_{HPF}$. In disk drives, vibration shocks can have frequency content as high as, for example, 15-100 kHz. In order to adequately time differentiate such vibration components of the accelerometer signal at 20 kHz, the pole created by the high-pass filter capacitor $C_{HPF}$ and an input resistance $R_{input}$ to a downstream gain stage may need to be at least 200 kHz (i.e., 10*20 kHz). The high-pass filter capacitor $C_{HPF}$ may therefore be selected to have a sufficiently low capacitance value to provide a sufficiently high pole in the high pass filter. However using a low capacitance value for the high-pass filter capacitor $C_{HPF}$ can provide an unacceptably low effective gain for components of the acceleration signal below the pole frequency, which can mask important characteristics of the vibration when the acceleration signal is differentiated and, thereby, reduce/eliminate the ability of the differentiated acceleration signal (jerk signal) to indicate such important vibration characteristics.

To retain/increase the contributions of components of the acceleration signal below the pole frequency to the time differentiated acceleration signal, the gain increase circuit 430 boosts the frequency response gain of the time differentiated acceleration signal from the high-pass filter capacitor $C_{HPF}$. The gain increase circuit 430 may, for example, boost the frequency response gain by a factor of at least 10. The gain increase circuit 430 can include an adjustable gain amplifier $A_{4\_4}$ that amplifies the time differentiated acceleration signal, which is supplied through the input resistor $R_{input}$, with an amplification that is adjusted via an adjustable resistor $R_{adj}$ connected as a feedback path from an output to an input of the amplifier $A_{4\_4}$. Another input of amplifier $A_{4\_4}$ is connected to the reference voltage $V_{ref}$. A differentiation enable circuit (register) 432, or other logic circuit, generates a signal that selectively turns-on a transistor $T_{4\_1}$ to boost the frequency response gain of the amplifier $A_{4\_4}$ and of the time differentiated acceleration signal that is output therefrom. When the transistor $T_{4\_1}$ is on, the input resistance to the adjustable gain amplifier $A_{4\_4}$ is decreased by the connection of another resistor $R_{diff}$ in parallel to the input resistor $R_{input}$ so as to reduce the input resistance to the amplifier $A_{4\_4}$. Accordingly, the frequency response gain of the differentiated acceleration signal is selectively boosted by causing the shock differentiation enable circuit 432 to turn on the transistor $T_{4\_1}$. The shock differentiation enable circuit 432, which may be a register value, which can be controlled by the data controller 202 to provide an increased vibration sensitivity mode which can enable rapid identification of high-frequency low-amplitude vibration, which may otherwise be missed, and cause responsive inhibiting of writing.

The higher-frequency time differentiated acceleration signal output from the amplifier $A_{4\_4}$ can be passed to the threshold range comparator 440 where it is compared to a threshold range and, when it becomes outside that range, cause an inhibit signal to be generated. The threshold range comparator 440 can include a pair of comparators $Comp_{4\_1}$ and $Comp_{4\_2}$, each of which compares the higher-frequency time differentiated acceleration signal to different threshold values (e.g., $V_{Ref}+$ and $V_{Ref}-$). When an amplitude of the higher-frequency time differentiated acceleration signal exceeds at least one of the threshold values, a logical signal generated by one or both of the comparators triggers an OR gate $OR_{4\_1}$ to generate the inhibit signal. The read write channel 206 can be configured to respond to the inhibit signal by inhibiting writing through the head 20 when, for example, the inhibit signal is logically high. The inhibit signal may be combined with other signals, such as a servo wedge signal and/or a temperature overheat signal, at another logically-OR circuit to form a write gate signal that selectively inhibits writing through the head 20.

As shown in FIG. 4, the higher-frequency time differentiated acceleration signal can be passed to the ADC 304 and the data controller 202 of FIG. 3 for further processing. The acceleration signal from the LPF may also be passed through another ADC and supplied to the data controller 202 for further processing. For example, as described above, the read write channel 206 may be regulated so that writing through the head 20 is selectively inhibited in response to the higher frequency time differentiated acceleration signal becoming outside a jerk threshold range, and can also be selectively inhibited in response to an amplitude of the acceleration signal becoming outside an acceleration threshold range. Accordingly, writing through the head 20 can be selectively inhibited so as compensate for both the vibration induced jerk characteristics and the acceleration characteristics experienced by the head 20.

Figure 5:
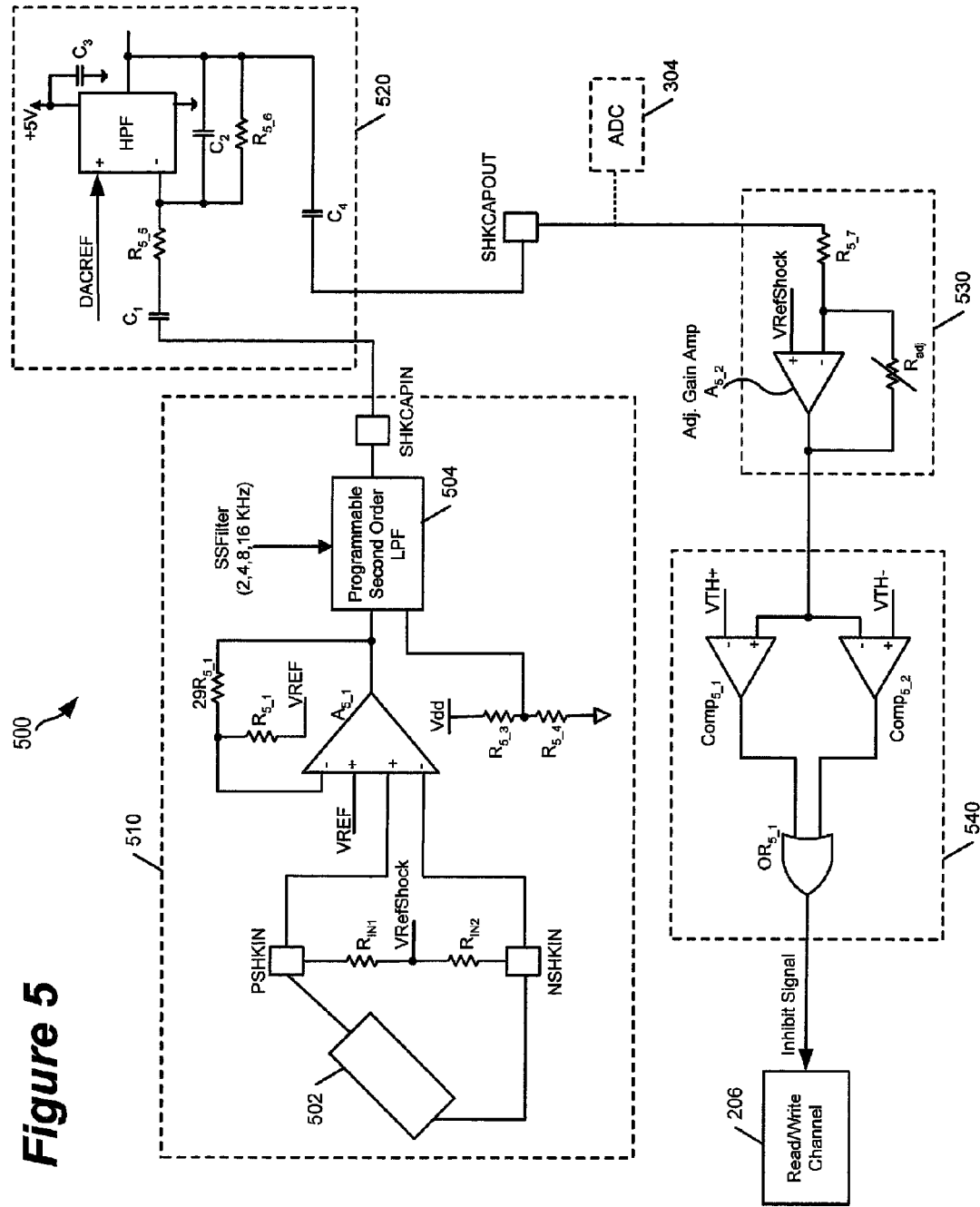
FIG. 5 is a circuit diagram of a circuit that selectively inhibits writing through a transducer in response to detected rate of change of an acceleration signal in accordance with some embodiments.

FIG. 5 is a circuit diagram of a circuit 500 that selectively inhibits writing through a transducer in response to detected rate of change of an acceleration signal in accordance with some embodiments. Referring to FIG. 5, the circuit includes an accelerometer circuit 510 that generates and conditions an acceleration signal, a differentiator circuit 520 that differentiates (i.e., determines the rate of change) in the acceleration signal to generate a jerk signal, a gain increase circuit 530 that increases the frequency response gain of the jerk signal (the differentiated acceleration signal), and a threshold range comparator 540 that generates an inhibit signal when the increased gain jerk signal is outside a threshold range.

The accelerometer circuit 510 includes an accelerometer 502, which may include, for example, a piezoelectric element that is configured to generate charge (picoCoulombs) that is modulated by vibration. A charge amplifier circuit is formed by a pair of parallel input resistors $R_{in1}$ and $R_{in2}$ connected across the terminals PSHKIN and NSHKIN of the accelerometer 502, and with a node between the resistors connected to a reference voltage (VRefshockk). The terminals PSHKIN and NSHKIN of the accelerometer 502 and a reference voltage VRef are also connected to inputs of a differential amplifier $A_{5\_1}$. The exemplary differential amplifier $A_{5\_1}$ has a gain of 29 by feeding the output of the amplifier $A_{5\_1}$ through a resistance network ($29R_{5\_1}$ and $R_{5\_1}$) to another input of amplifier $A_{5\_1}$. The amplified accelerometer signal that is output by the amplifier $A_{5\_1}$ is low pass filtered by a programmable second-order low pass filter 504 to reduce noise. The programmable second-order low pass filter 504 can be regulated to selectively exhibit a plurality of different low pass corner frequencies of, for example, 2 kHz, 4 kHz, 6 kHz, and 8 kHz.

The filtered signal from the filter 504 is differentiated by the differentiator circuit 520, which may can include a high pass filter (HPF) which may, for example, have a pole frequency of at least 200 kHz to enable sensing of high frequency content of the acceleration signal as high as, for example, 15-100 kHz.

To retain/increase the contributions of components of the acceleration signal below the pole frequency of the HPF to the time differentiated acceleration signal, the gain increase circuit 530 boosts the frequency response gain of the time differentiated acceleration signal from the HPF. The gain increase circuit 530 can include an adjustable gain amplifier $A_{5\_2}$ that amplifies the time differentiated acceleration signal, which is supplied through the input resistor $R_{5\_7}$, with an amplification that is adjusted via an adjustable resistor $R_{adj}$ connected as a feedback path from an output to an input of the amplifier $A_{5\_2}$. Another input of amplifier $A_{5\_2}$ is connected to the reference voltage $V_{RefShock}$. The gain increase circuit 530 can provide increased vibration sensitivity which can enable rapid identification of high-frequency low-amplitude vibration, which may otherwise be missed, and cause responsive inhibiting of writing.

The higher-frequency time differentiated acceleration signal output from the amplifier $A_{5\_2}$ can be passed to the threshold range comparator 540 where it is compared to a threshold range and, when it becomes outside that range, cause an inhibit signal to be generated. The threshold range comparator 540 can include a pair of comparators $Comp_{5\_1}$ and Comp$_{5\_2}$, each of which compares the higher-frequency time differentiated acceleration signal to different threshold values (e.g., V$_{Th}$+ and V$_{Th}$−). When an amplitude of the higher-frequency time differentiated acceleration signal exceeds at least one of the threshold values, a logical signal generated by one or both of the comparators triggers an OR gate OR$_{5\_1}$ to generate the inhibit signal. The read write channel 206 can be configured to respond to the inhibit signal by inhibiting writing through the head 20 when, for example, the inhibit signal is logically high. The inhibit signal may be combined with other signals, such as a servo wedge signal and/or a temperature overheat signal, at another logically-OR circuit to form a write gate signal that selectively inhibits writing through the head 20.

As shown in FIG. 5, the higher-frequency time differentiated acceleration signal can be passed to the ADC 304 and the data controller 202 of FIG. 3 for further processing. The acceleration signal from the LPF 504 may be passed from node SHKCAPIN through another ADC and supplied to the data controller 202 for further processing. For example, as described above, the read write channel 206 may be regulated so that writing through the head 20 is selectively inhibited in response to the higher frequency time differentiated acceleration signal becoming outside a jerk threshold range, and can also be selectively inhibited in response to an amplitude of the acceleration signal becoming outside an acceleration threshold range. Accordingly, writing through the head 20 can be selectively inhibited so as compensate for both the vibration induced jerk characteristics and the acceleration characteristics experienced by the head 20.

In the drawings and specification, there have been disclosed typical preferred embodiments of the invention and, although specific terms are employed, they are used in a generic and descriptive sense only and not for purposes of limitation, the scope of the invention being set forth in the following claims.

What is claimed is:

1. A method comprising:
 detecting a rate of change of an acceleration signal; and
 selectively inhibiting output of a signal through the transducer in response to the detected rate of change of the acceleration signal.

2. The method of claim 1, wherein selectively inhibiting output of a signal through the transducer comprises inhibiting writing of data through the transducer onto an adjacent media when the detected rate of change in the acceleration signal becomes outside a threshold range.

3. The method of claim 2, wherein inhibiting writing of data comprises asserting a write gate signal to inhibit writing of data through the transducer onto a rotating disk media.

4. The method of claim 1, wherein:
 detecting a rate of change of an acceleration signal comprises high-pass filtering and increasing a frequency response gain of the acceleration signal to generate a jerk signal that indicates the rate of change of the acceleration signal; and
 output of a signal through the transducer is selectively inhibited in response to the jerk signal.

5. The method of claim 4, wherein the acceleration signal is high-pass filtered and then a frequency response gain of the high-pass filtered acceleration signal is increased to generate the jerk signal.

6. The method of claim 4, wherein a frequency response gain of the acceleration signal is increased and then the higher-frequency acceleration signal is high-pass filtered to generate the jerk signal.

7. The method of claim 4, wherein the frequency response gain of the acceleration signal is increased at least ten times.

8. The method of claim 4, wherein output of a signal through the transducer is selectively inhibited in response to the jerk signal becoming outside a jerk threshold range and is selectively inhibited in response to an amplitude of the acceleration signal, without the high-pass filtering and the increase in frequency response gain, becoming outside an acceleration threshold range.

9. The method of claim 1, wherein detecting a rate of change of an acceleration signal comprises:
 increasing a frequency response gain of the acceleration signal to generate a higher frequency acceleration signal;
 generating discrete time samples of the higher frequency acceleration signal; and
 detecting the rate of change of the acceleration signal as the change over time between the discrete time samples.

10. An apparatus comprising:
 a circuit that detects a rate of change of an acceleration signal which is indicative of transducer vibration, and that generates a transducer output inhibit signal in response to the detected rate of change of the acceleration signal.

11. The apparatus of claim 10, further comprising:
 a write circuit that selectively inhibits generation of a write signal through a transducer to a media in response to the transducer output inhibit signal.

12. The apparatus of claim 10, wherein the circuit high-pass filters and increases a frequency response gain of the acceleration signal to generate a jerk signal that indicates the rate of change of the acceleration signal, and generates the transducer output inhibit signal in response to the jerk signal.

13. The apparatus of claim 12, wherein the circuit comprises:
 a gain increase circuit that increases a frequency response gain of the acceleration signal to generate a higher frequency acceleration signal;
 a high-pass filter that filters the high frequency acceleration signal to generate the jerk signal; and
 an inhibit signal circuit that generates the transducer output inhibit signal in response to the jerk signal.

14. The apparatus of claim 12, wherein the circuit comprises:
 a high-pass filter that filters the acceleration signal;
 a gain increase circuit that increases a frequency response gain of the high-pass filtered acceleration signal to generate the jerk signal; and
 an inhibit signal circuit that generates the transducer output inhibit signal in response to the jerk signal.

15. The apparatus of claim 12, wherein the circuit increases the frequency response gain of the acceleration signal at least ten times.

16. The apparatus of claim 12, wherein the circuit generates the transducer output inhibit signal in response to the jerk signal becoming outside a jerk threshold range, and generates the transducer output inhibit signal in response to an amplitude of the acceleration signal, without the high-pass filtering and the increase in frequency response gain, becoming outside an acceleration threshold range.

17. The apparatus of claim 10, wherein the circuit increases a frequency response gain of the acceleration signal to generate a higher frequency acceleration signal, generates discrete time samples of the higher frequency acceleration signal, and detects the rate of change of the acceleration signal from a change over time between the discrete time samples.

18. An apparatus comprising:
a transducer that writes data on a recordable media;
an accelerometer that generates an acceleration signal that is indicative of transducer vibration; and
a circuit that selectively inhibits writing of data through the transducer in response to a rate of change of the acceleration signal.

19. The apparatus of claim 18, wherein the circuit high-pass filters and increases a frequency response gain of the acceleration signal to generate a jerk signal that indicates the rate of change of the acceleration signal, and selectively inhibits writing of data through the transducer in response to the jerk signal.

20. The apparatus of claim 19, wherein the circuit selectively inhibits writing of data through the transducer in response to the jerk signal becoming outside a jerk threshold range, and selectively inhibits writing of data through the transducer in response to an amplitude of the acceleration signal, without the high-pass filtering and the increase in frequency response gain, becoming outside an acceleration threshold range.

* * * * *